Sheet 1-2 Sheets.

H. Waterman.
Mower.

N° 13512    Patented Aug. 28, 1855.

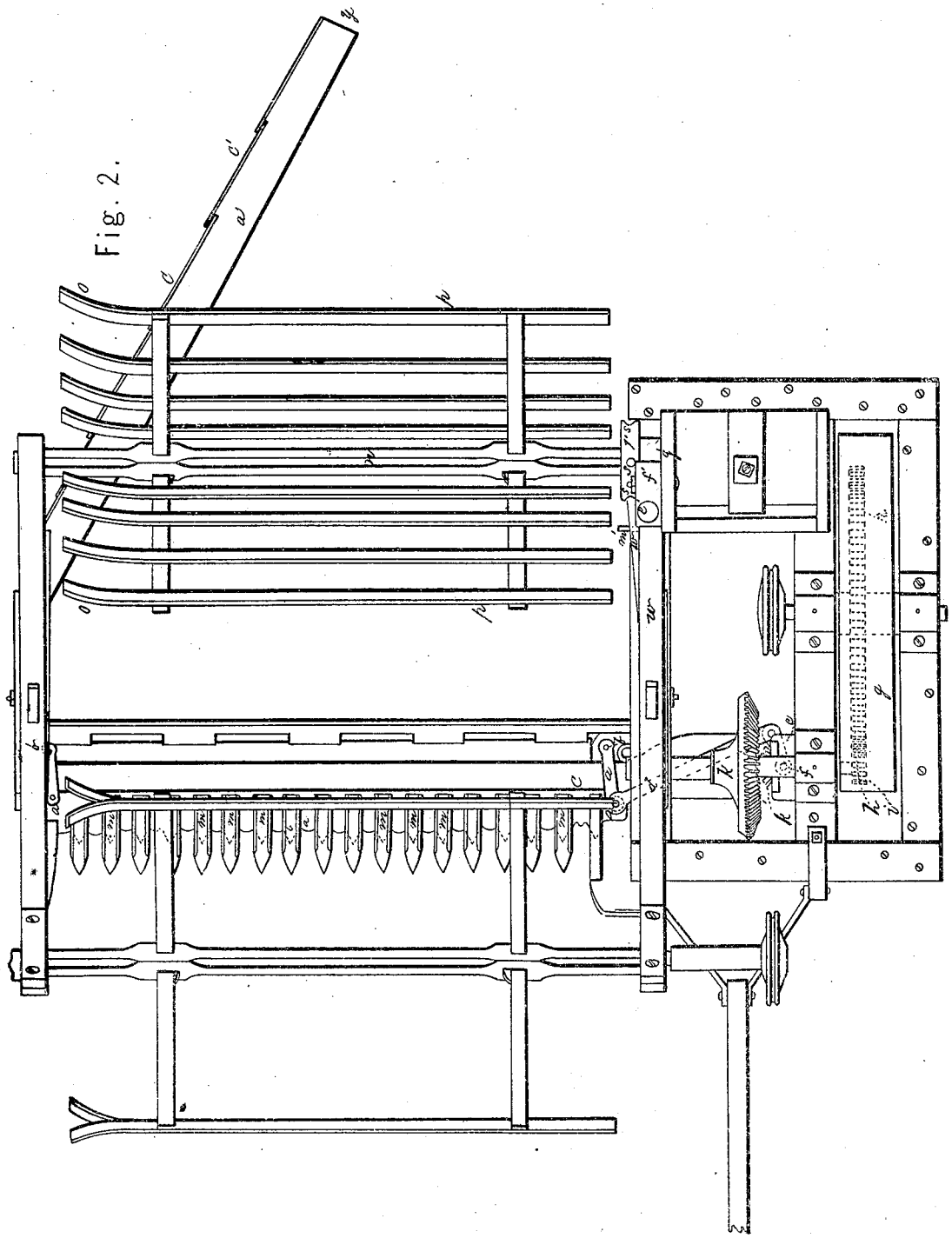

UNITED STATES PATENT OFFICE.

HENRY WATERMAN, OF WILLIAMSBURG, NEW YORK.

IMPROVEMENT IN REAPING AND MOWING MACHINES.

Specification forming part of Letters Patent No. 13,512, dated August 28, 1855.

*To all whom it may concern:*

Be it known that I, HENRY WATERMAN, of Williamsburg, in the county of Kings and State of New York, have invented an Improvement in Machines for Reaping and Mowing; and I do hereby declare that the following is a full, clear, and exact description of the principle or character which distinguishes it from all other things before known, and of the usual manner of making, modifying, and using the same, reference being had to the accompanying drawings.

Figure 1:
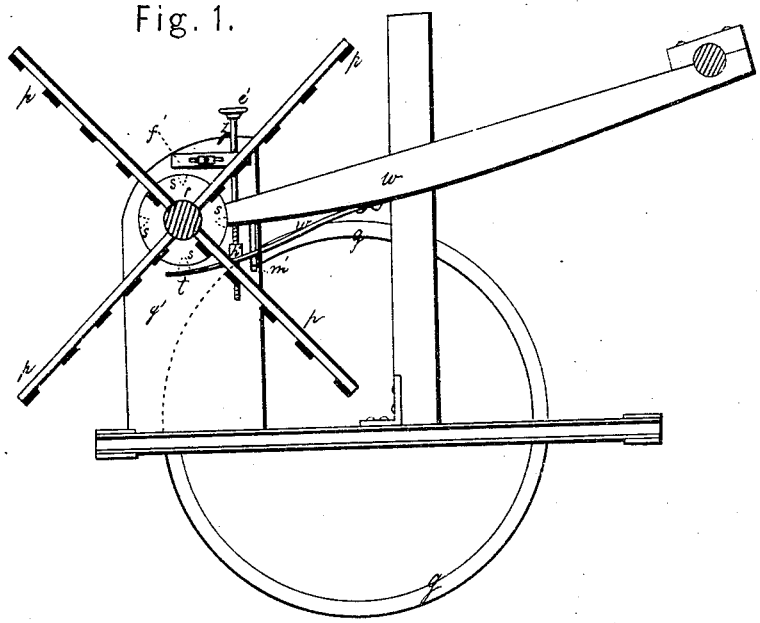
Figure 3:
Figure 4:
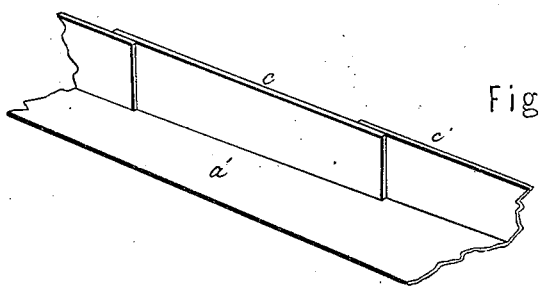

Figure 1 represents a section taken vertically through the center of the machine. Fig. 2 is a plan of the machine. Fig. 3 is one of the fingers, showing the knife in section. Fig. 4 is a detached view of the flexible deflector.

My invention consists in certain improvements in machines for reaping and mowing, whereby the cutting is facilitated and clogging prevented and the grain collected and deposited in proper quantities at suitable intervals and in its proper position on the field.

The difficulty of cutting wet grass by mowing-machines is well known, and it arises not only from the difficulty of making the cut, but from the "gumming" and clogging of the knives. To obviate these difficulties I give an advancing and retreating curvilinear motion to the knives as follows: The cutter-bar is connected at each end by pivot-joints to the arms $a\ a$, which vibrate about the fixed centers $b\ b$. The end $c$ of the cutter-bar is attached by a pivot-joint to the connecting-rod $d$, which takes hold of the bell-crank $e$ upon the pinion-shaft $f$, which last receives its motion from the main driving-wheel $g$, through the medium of the inner gear, $h$, pinion $i$, and bevel-gear $k\ k'$. From this mode of attaching and operating the cutter-bar it will be seen that it, with its knives, has an advancing and retreating curvilinear motion, which secures the advantage of a "draw-cut," and is the motion best suited to clear the spaces between the knives and the fingers. The range of motion being greater than in the straight reciprocating cut, I adapt the cutting and cleaning edges of the knives to their proper action by using two sets of knives or cutting-edges—viz., the projecting knives $b\ b$ and the intermediate knives or edges, $a\ a$. Both these knives perform the offices of cutting and cleaning, and while the cut is effected with more ease than with the usual rectilinear motion of the cutter-bar the cleaning is effected in a very perfect manner.

The knives may be made in any of the well-known forms not inconsistent with my peculiar action, and the fingers $m\ m$, &c., I make elastic instead of making them firm and unyielding, as they are usually from being made of cast-iron. A twofold purpose is thus accomplished by the elastic fingers—viz., when sticks or any obstructing material get between the fingers and knives the spring of the fingers admits of their being easily dragged out by the retreating motion of the knife.

For the purpose of collecting and depositing the grain I have contrived a gathering-reel of peculiar operation. This reel, revolving upon the axis $n$, is composed of four or more cradles, $p\ p\ p\ p$, having curved ends or fingers $o\ o\ o\ o$ on their ends nearest the standing grain. At the end of the reel next the driver's seat there is upon its axis $n$ a count-wheel, $r$, provided upon its periphery with four holes, $s$, or as many holes as there may be reels. These holes receive in succession, as the reel revolves, the check-pin $t$, which is on the spring $u$, the other end of the spring being fast to the reel-beam $w$. The check-pin is controlled by the driver through the count-rod $z$. This rod, provided with a suitable knob or cap-piece, $e'$, plays freely up and down in suitable apertures in the reel-beam and the projecting piece $f'$, attached to the upright $g'$. There is a nut, $h'$, upon the count-rod, and one side of this nut rests upon the spring, so that when the driver presses down knob $e'$ the spring is depressed and the check-pin is carried out of an aperture in the count-wheel and the further depression of the spring checked by the stop-bolt $m'$, attached to the reel-beam. As the reel revolves the pressure of the spring against the periphery of the count-wheel carries the check-pin into the succeeding aperture. The reel revolves by the weight of the grain resting upon the lower cradle. During the operation of the machine the grain accumulates upon the lowermost cradle of the reel, and when a sufficient gavel is attained the driver depresses the check-pin, the weight of the gavel causes the reel to make a quarter of a revolution, and the gavel drops upon the field.

It is obvious that the stopping of the reel may be effected by mechanical means without changing the operation of the reel, although I prefer the present mode. As the grain is laid across the swath it is turned so as to lie in the direction of the swath, and be out of the way of the horses at the next cut, by means of a deflector of a peculiar description. This deflector $y$ is attached to the rear end of the guard or side board, and is made of a flexible strip, $a'$, of metal or other suitable material, and a deflecting side, $b'$. This side is composed of sections $c'\ c'$, &c., attached by their lower edges to the strip $a'$, and having their vertical edges overlapping each other and free, so as to admit of the flexure of the strip $a'$ as it passes over irregularities and obstructions upon the surface of the field.

I do not claim the advancing and retreating curvilinear motion of the cutter-bar; but

I claim—

1. The combination of the two sets of knives described with the curvilinear motion of the cutter-bar, as set forth.

2. The elastic fingers, in combination with the curvilinear motion of the cutter-bar.

3. Collecting and depositing the grain by the revolving cradles actuated by the weight of the grain laid upon them by the reel, in the manner set forth.

4. The flexible deflector constructed and operating as set forth.

HENRY WATERMAN.

Witnesses:
T. CAMPBELL,
R. G. CAMPBELL.